US010538220B1

(12) United States Patent
Tyagi et al.

(10) Patent No.: US 10,538,220 B1
(45) Date of Patent: Jan. 21, 2020

(54) USER ACTIVATED/DEACTIVATED SHORT-RANGE WIRELESS COMMUNICATIONS (SRWC) AUXILIARY KEY FOB (71) Applicant: GM GLOBAL TECHNOLOGY OPERATIONS LLC, Detroit, MI (US)

(72) Inventors: Anuj Tyagi, Rochester Hills, MI (US); Mukesh Gupta, Farmington, MI (US); Vijay Vardhan, Sterling Heights, MI (US); Nikola J. Pudar, Farmington Hills, MI (US); Amanda J. Kalhous, Ajax (CA); Dwayne A. Crocker, Lake Orion, MI (US); Nathaniel H. Williams, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/123,833

(22) Filed: Sep. 6, 2018

(51) Int. Cl.
*B60R 25/24* (2013.01)
*G07C 9/00* (2006.01)

(52) U.S. Cl.
CPC ........ *B60R 25/245* (2013.01); *G07C 9/00309* (2013.01); *B60R 2325/101* (2013.01); *G07C 2009/00404* (2013.01); *G07C 2009/00547* (2013.01); *G07C 2209/63* (2013.01)

(58) Field of Classification Search
CPC .......................... B60R 25/245; G07C 9/00309
USPC ....................................................... 340/5.61
See application file for complete search history.

(56) References Cited

U.S. PATENT DOCUMENTS

| 6,538,557 B1* | 3/2003 | Giessl ..................... B60R 25/24 340/12.5 |
| 6,713,895 B1* | 3/2004 | Krapfl ................ G07C 9/00944 307/10.1 |
| 9,894,492 B1* | 2/2018 | Elangovan ........... H01Q 1/3241 |
| 2006/0184456 A1* | 8/2006 | de Janasz .............. G06Q 20/12 705/72 |
| 2013/0033361 A1* | 2/2013 | Lickfelt .................. B60R 25/00 340/5.72 |
| 2014/0114503 A1* | 4/2014 | Ghabra .................... H04Q 9/00 701/2 |
| 2014/0240091 A1* | 8/2014 | Talty .................. G07C 9/00309 340/5.62 |
| 2017/0166163 A1* | 6/2017 | Poma ................. G07C 9/00174 |

* cited by examiner

*Primary Examiner* — Vernal U Brown
(74) *Attorney, Agent, or Firm* — Reising Ethington P.C.; David Willoughby (57) ABSTRACT

A system and method of activating and using an auxiliary key fob with a vehicle, including the steps of: pairing the auxiliary key fob and the vehicle; receiving an activation request at the vehicle, the activation request indicating to the vehicle to activate the auxiliary key fob for use with the vehicle; activating the auxiliary key fob in a particular access mode for use with the vehicle; receiving a SRWC credentials signal from the auxiliary key fob at a SRWC passive entry passive start (PEPS) module installed in the vehicle; after receiving the SRWC credentials signal, sending information included in or derived from the SRWC credentials signal to the VSM of the vehicle; determining that the auxiliary key fob is authorized at the VSM based at least in part on the information sent to the VSM; and carrying out a vehicle access function in response to the determination.

16 Claims, 3 Drawing Sheets

USER ACTIVATED/DEACTIVATED SHORT-RANGE WIRELESS COMMUNICATIONS (SRWC) AUXILIARY KEY FOB

INTRODUCTION

This invention relates to key fobs used for accessing and operating a vehicle.

Vehicles today include many components, devices, and modules that send and/or receive data between the vehicle and a remote server (e.g., a vehicle backend service facility) and between the vehicle and a short-range wireless (SRWC) device such as a smartphone or key fob, both of which may be used as a wireless virtual vehicle key that enables access control for the vehicle (e.g., locking and unlocking of the vehicle) as well as operational control (starting and driving of the vehicle). By doing so, this data communication may be used to provide increased user-accessible functionality, improved user convenience, and better security, all of which may enhance the overall user experience.

SUMMARY

According to one aspect of the invention, there is provided a method of activating and using an auxiliary key fob with a vehicle, the auxiliary key fob including a short-range wireless communications (SRWC) circuit and a universal serial bus (USB) connector, and the method including the steps of: pairing the auxiliary key fob and the vehicle, wherein the pairing includes storing a virtual vehicle key at a vehicle system module (VSM) of the vehicle; receiving an activation request at the vehicle, the activation request indicating to the vehicle to activate the auxiliary key fob for use with the vehicle; in response to the activation request, activating the auxiliary key fob in a particular access mode for use with the vehicle; receiving a SRWC credentials signal from the auxiliary key fob at a SRWC passive entry passive start (PEPS) module installed in the vehicle, the SRWC PEPS module including a SRWC circuit, and the SRWC credentials signal being communicated from the auxiliary key fob to the SRWC PEPS module via a secured SRWC connection and the SRWC circuit of the SRWC PEPS module; after receiving the SRWC credentials signal, sending information included in or derived from the SRWC credentials signal to the VSM of the vehicle; determining that the auxiliary key fob is authorized at the VSM based at least in part on the information sent to the VSM from the SRWC PEPS module; and carrying out a vehicle access function in response to the determination that the auxiliary key fob is authorized.

According to various embodiments, this method may further include any one of the following features or any technically-feasible combination of some or all of these features:

- the VSM is a body control module (BCM) of the vehicle, the BCM being separate from the SRWC PEPS module, and wherein the BCM and the SRWC PEPS module are communicatively coupled to one another via a communications bus;
- the SRWC circuit of the auxiliary key fob and the SRWC circuit of the PEPS module are each a Bluetooth™ Low Energy (BLE) circuit such that the SRWC PEPS module is a BLE PEPS module, and wherein the pairing step includes storing BLE key data at the BLE PEPS module;
- after the activating step, establishing a secure BLE connection between the BLE PEPS module and the auxiliary key fob through use of the BLE key data, and wherein the SRWC credentials signal is a BLE credentials signal that is encrypted and sent over the established secure BLE connection from the auxiliary key fob to the BLE PEPS module;
- the pairing step includes pre-storing authentication information in the auxiliary key fob and in the VSM of the vehicle, wherein the activating step includes modifying key authorization data stored at the VSM, and wherein the determining step includes: receiving the authentication information at the vehicle from the auxiliary key fob; authenticating the auxiliary key fob using the received authentication information and the authentication information that is pre-stored on the vehicle; and determining from the key authorization data that the auxiliary key fob is activated, wherein the key authorization data indicates whether the auxiliary key fob is activated or deactivated;
- the activation request is received from a primary operator of the vehicle via a remote facility in response to the remote facility receiving an initial activation request from the primary operator via a handheld wireless device (HWD), the initial activation request being generated at the HWD based at least in part on information inputted into the HWD by the primary operator;
- the HWD includes a virtual vehicle key that permits the HWD to act as a vehicle key for the vehicle;
- the HWD is configured to present a notification when a state of charge (SoC) of a battery of the HWD is below a predetermined SoC value, the notification querying the primary operator via the HWD of whether the auxiliary key fob is to be activated;
- the HWD is configured to send the initial activation request to the remote facility in response to determining that the auxiliary key fob is to be activated based on a response to the notification;
- the particular access mode is a backup key mode that permits the auxiliary key fob to act as a primary vehicle key;
- the SRWC circuit of the auxiliary key fob only transmits wireless signals according to one or more IEEE 802.x standards;
- the activation request is generated at the vehicle based at least in part on information inputted into one or more vehicle user interfaces of the vehicle by a user of the vehicle;
- the user information inputted into the one or more vehicle user interfaces of the vehicle includes a user selected valet mode to be carried out at the vehicle;
- the particular access mode is the valet mode, the valet mode permitting the auxiliary key fob to be used in a limited access mode while allowing a primary vehicle key of the user to be used in a full access mode; and/or
- the activation request is sent to a remote facility for verification of user credentials included as part of the information inputted into the one or more vehicle user interfaces of the vehicle, and wherein the activating step is carried out in response to the vehicle receiving a verification message from the remote facility.

According to another aspect of the invention, there is provided a Bluetooth™ Low Energy (BLE) auxiliary key fob, including: a BLE circuit that transmits BLE signals using an antenna; a processor and memory, the memory storing BLE key data and a virtual vehicle key; a light emitting diode (LED) coupled to the processor; a rechargeable battery that powers the BLE circuit, the processor, and the LED; a universal serial bus (USB) connector being coupled to the rechargeable battery such that, when the USB connector is connected to a complementary USB port, electrical power is provided across the USB connector and to the rechargeable battery; and a housing enclosing at least the BLE circuit, the processor, the memory, and the rechargeable battery; wherein the BLE auxiliary key fob includes computer instructions that, when executed by the processor, causes the BLE auxiliary key fob to: (i) establish a BLE connection with a BLE passive entry passive start (PEPS) module of the vehicle using the BLE key data in response to receiving a BLE beacon signal from the BLE PEPS module; and (ii) after establishing the BLE connection with the BLE PEPS module of the vehicle, sending a BLE credentials message to the BLE PEPS module over the established BLE connection using the BLE circuit, the BLE credentials message including the virtual vehicle key.

According to various embodiments, this BLE auxiliary key fob may further include any one of the following features or any technically-feasible combination of some or all of these features:

- a button that is communicatively coupled to the processor, the button causing a signal to be sent to the processor when the button is pressed, and wherein the processor causes the BLE circuit to transmit a BLE signal in response to the signal being received from the button;
- the BLE auxiliary key fob lacks wireless communication capabilities other than those that use a Bluetooth™ or other IEEE 802.x standard;
- the BLE auxiliary key fob is configured to emit light from the LED in response to determining that the BLE auxiliary key fob is activated for use with the vehicle; and/or
- the computer instructions, when executed by the process, further cause the BLE auxiliary key fob to determine whether the BLE auxiliary key fob is activated based on an indication received from an external device and to establish the BLE connection with the BLE PEPS module when it is determined that the BLE auxiliary key fob is activated.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The system and methods below enable a short-range wireless (SRWC) auxiliary key fob to be selectively activated and deactivated by a primary operator (user) of a vehicle such that the key fob normally is inoperable to carry out access and operational functions on the vehicle, but, once activated, can be used by the holder of the key fob to gain access and operate the vehicle. As used herein, "activating" and its noun and adjective forms mean that the system has changed the key fob from an operationally disabled (deactivated) state, in which it cannot be used to access the vehicle or control vehicle functions, to an enabled state in which it can be used to access the vehicle or control vehicle functions. This may be done in various ways such as by wirelessly configuring the key fob, the vehicle, or both when requested by the user. For example, using SRWC the key fob either may be configured from the vehicle when requested by the user to thereafter be able to communicate commands with the vehicle or may be configured by providing the key fob with a cryptographic token or other virtual vehicle key. Alternatively, activating of the key fob may be done, not by modifying the key fob or its data/programming, but instead by configuring the vehicle to accept (act on) commands received from the key fob when the key fob is properly authenticated (e.g., by comparing a cryptographic token provided by the key fob with one stored on the vehicle) and when separate key authorization data on the vehicle indicates that the key fob is authorized to access and operate the vehicle. However, in the context of activating the key fob, the term "activating" and its noun and adjective forms do not refer to merely using or operating a key fob by a user (e.g., by a door unlock button press) or to merely energizing the key fob by a battery or other source so that it is powered for wireless communications.

In some scenarios, a primary operator (user) of a vehicle may desire to grant another individual the ability to operate the vehicle without having to relinquish possession of their primary key fob or other vehicle key. For example, a primary operator of the vehicle may desire to drop their vehicle off with a valet service and at the same time maintain possession of their vehicle key, which may be their smartphone in the case where the primary operator reserved the vehicle, for example. In one exemplary scenario, the primary operator can reserve a vehicle using a car sharing service and, pursuant to the car reservation, the user's smartphone (or other handheld wireless device (HWD)) can be configured to act as a primary vehicle key. In another scenario, a primary operator of the vehicle may be located remotely from the vehicle and/or another individual that desires to access and/or operate the vehicle. In either case, it may be desirable for the primary operator to activate another key fob, such as an auxiliary key fob, so that the individual desiring to access and/or operate the vehicle (the "secondary operator") can do so without having to take possession of the primary operator's vehicle key.

Thus, at least according to one embodiment, the vehicle can include a SRWC auxiliary key fob that is activated by an operator (e.g., the primary operator) through use of the operator's smartphone or other HWD. The SRWC auxiliary key fob can include a SRWC circuit, such as a Bluetooth™ Low Energy circuit that can be used for communications with the vehicle. The activation process can include the primary operator inputting information into a user interface of the HWD or a vehicle user interface and, then, this information can be sent as an initial activation request to a remote facility that then verifies the authenticity and/or authorization of the user in making the request. Once successfully verified, the remote facility can send an activation request to the vehicle. In at least one embodiment, the activation request can include a virtual vehicle key (e.g., a cryptographic token) that can be passed to a body control module (BCM) (or other VSM) of the vehicle. Then, by receiving a corresponding pre-stored cryptographic token from the key fob (when used by someone attempting to access the vehicle), the received token can be compared to the downloaded token and used to determine that the key fob is activated and may be used to access the vehicle.

In another embodiment, the cryptographic tokens (or other virtual vehicle key information) may be pre-stored on both the key fob and the vehicle, such as at the time of manufacture or otherwise before original delivery of the vehicle to a customer, and the activation request can include key authorization data that indicates that the key fob should be activated or deactivated according to the primary operator's initial request. The BCM can then modify the key authorization data (or other information and/or computer instructions) stored on the vehicle such that, when the key fob sends a virtual vehicle key to the vehicle, the BCM determines from the key authorization data whether to provide the key fob with access to and/or control of the vehicle (e.g., unlocking the vehicle, starting the vehicle). For example, when the auxiliary key fob (or other activated key fob) comes within range of a short-range wireless communications (SRWC) passive entry passive start (PEPS) module of the vehicle, the SRWC PEPS module can communicate with the auxiliary key fob through short-range wireless communications (SRWC), such as Bluetooth™ Low Energy (BLE). Information received at the SRWC PEPS module from the auxiliary key fob can be sent to the BCM of the vehicle, which can then be used to authenticate the auxiliary key fob and to determine whether it has been activated and thus permitted to command one or more vehicle functions.

In one embodiment, the auxiliary key fob can be activated in a valet mode (or other limited access mode) in which the key fob permits access to the vehicle, but does not include all of the usual or regular permissions associated with a typical vehicle key (or "primary vehicle key"). For example, when the vehicle is operated with the auxiliary key fob in the valet mode, the secondary user (e.g., the valet attendant) may be able to start the vehicle, but may not be able to drive the vehicle over a certain predefined speed. Also, as a part of a limited access mode (e.g., the valet mode), the vehicle may notify the primary operator via sending a notification to the HWD of the primary user when certain predefined events occur, such as the vehicle travelling beyond a predetermined distance or out of a predetermined geographical zone.

Figure 1:
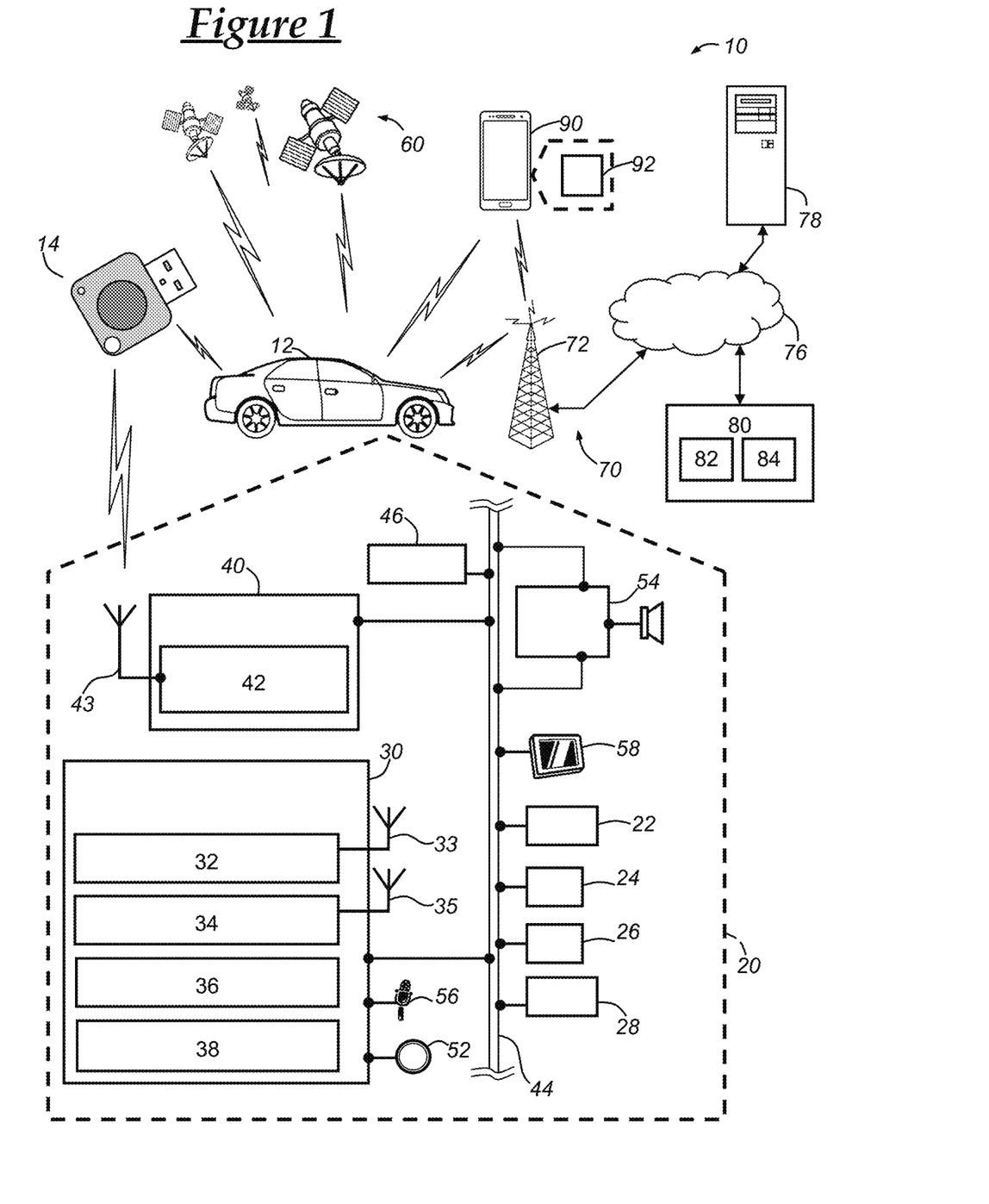
FIG. 1 is a block diagram depicting an embodiment of a communications system that is capable of utilizing the method disclosed herein.

With reference to FIG. 1, there is shown an operating environment that comprises a vehicle communications system 10 and that can be used to implement the method disclosed herein. Vehicle communications system 10 generally includes a vehicle 12 with a wireless communications device 30, an auxiliary key fob 14, a constellation of satellites 60, one or more wireless carrier systems 70, a land communications network 76, a computer 78, a remote facility 80, and a handheld wireless device (HWD) 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such car sharing system 10; however, other systems not shown here could employ the disclosed method as well.

Wireless carrier system 70 may be any suitable cellular communications or telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., wireless communications device 30, HWD 90). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates reservations and/or registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Vehicle backend services facility 80 is a remote facility, meaning that it is located at a physical location that is located remotely from the vehicle 12. The vehicle backend services facility 80 (or "remote facility 80") may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. One or more databases at the remote facility 80 can store various information and can include a vehicle operation database that stores information regarding the operation of various vehicles (e.g., vehicle telemetry or sensor data). Also, the remote server 80 can receive can thus act to distribute software (and/or software updates) to the various vehicles including vehicle 12. The databases 84 can also store various virtual vehicle keys, such as those discussed below, as well as other vehicle key authentication/authorization information. In one embodiment, the databases 84 store cryptographic tokens that are issued to users of a vehicle sharing network. These cryptographic tokens can be generated and/or issued to users when the user makes a reservation to use a particular vehicle. A cryptographic token can be sent to a handheld wireless device (HWD) once the reservation is confirmed. The cryptographic token can be a virtual vehicle key or used with a virtual vehicle key.

The handheld wireless device (HWD) 90 is a SRWC device (i.e., a device capable of SRWC) and may include: hardware, software, and/or firmware enabling cellular telecommunications and SRWC as well as other mobile device applications, such as a vehicle management application 92. The hardware of the HWD 90 may comprise: a processor and memory for storing the software, firmware, etc. The HWD processor and memory may enable various software applications, which may be preinstalled or installed by the user (or manufacturer) (e.g., having a software application or graphical user interface (GUI)). One implementation of the application 92 enables a vehicle user to communicate with the vehicle 12 and/or control various aspects or functions of the vehicle, some of which are listed above. Additionally, one or more applications may allow the user to connect with the remote facility 80 or call center advisors at any time.

The processor of the HWD 90 can be any type of device capable of processing electronic instructions including microprocessors, microcontrollers, host processors, controllers, vehicle communication processors, and application specific integrated circuits (ASICs). The processor executes various types of digitally-stored instructions, such as software or firmware programs stored in memory of the HWD 90, which enable the device 90 to provide a wide variety of functionality. For instance, in one embodiment, the processor can execute programs (e.g., the vehicle management application 92) or process data to carry out at least a part of a method discussed herein. In some embodiments, the HWD 90 can be a smartphone or tablet that includes an operating system, such as Android™, iOS™, Microsoft Windows™, and/or other operating systems. The memory of the HWD 90 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. In one embodiment, the memory of HWD 90 may be a non-volatile memory card, such as a Secure Digital™ (SD) card, that is inserted into a card slot of HWD 90.

The HWD 90 can also include a short range wireless communications (SRWC) circuit and/or chipset as well as one or more antennas, which allows it to carry out SRWC, such as any of the IEEE 802.11 protocols, WiMAX™, ZigBee™, Wi-Fi Direct™ Bluetooth™, or near field communication (NFC). The SRWC circuit and/or chipset may allow HWD 90 to connect to another SRWC device. Additionally, HWD 90 can include a cellular chipset thereby allowing the device to communicate via one or more cellular protocols, such as GSM/GPRS technology, CDMA or CDMA2000 technology, and LTE technology. The HWD 90 may communicate data over wireless carrier system 70 using the cellular chipset and an antenna.

In some embodiments, the HWD 90 acts as a passive entry key (e.g., a passive entry/passive start (PEPS) key, a smart key). For example, as discussed above, the HWD may be provided a virtual vehicle key (e.g., a cryptographic token) or other information that authorizes the device to access the vehicle. Such an embodiment may be implemented pursuant to a car sharing service whereby a remote facility coordinates car rentals or ride sharing, such as remote facility 80. In some embodiments, the remote facility 80 issues a virtual vehicle key (or digital key) (e.g., a string or array of bits) to the HWD 90. This virtual key can already be known and stored at the vehicle 12, such as in memory of the body control module (BCM) 26. In other embodiments, the virtual key is generated by the remote facility and sent to both the vehicle 12 and the HWD 90. The HWD 90 may then securely communicate the virtual key to the vehicle (e.g., via an established SRWC connection) and the vehicle may then determine whether the virtual key is authorized to access the vehicle. In some scenarios in which the HWD 90 is used as a passive entry key as a part of a car sharing service, once the vehicle successfully is reserved by a user, the HWD 90 may be enabled and authorized to control certain vehicle functions through the wireless transmission of vehicle commands and/or may be enabled for a certain period of time.

In at least one embodiment, a user can operate the vehicle management application 92 using the HWD 90 to initiate a key fob activation process and, in doing so, may also specify certain parameters regarding the activation of the auxiliary key fob 14. For example, the user can specify an access mode for the key fob, such as a regular or full access mode or a limited access mode, such as a valet mode. In other embodiments, the user can specify particular parameters, such as a time period, an expiration time, or a length of time in which the auxiliary key fob 14 will be activated or enabled for use with the vehicle. The key fob may have a predefined set of vehicle commands that it may be permitted to send when it is activated, or the set of vehicle commands can be specified by a user using the application 92. In one scenario, the user may only desire that the key fob operator be permitted access to the cabin and trunk of the vehicle, and may indicate this using the application 92. In another scenario, the user may desire to grant the key fob operator the ability to have full control of the vehicle (i.e., the regular or full access) for a certain period of time or for a predetermined length of time. In another example, the user can specify a maximum range that the vehicle may be driven within or a maximum amount of miles with which a key fob operator may drive the vehicle. The key fob may then become deactivated upon the time period ending or the length of time expiring, which can be carried out by modifying key authorization data (and/or authentication data) at the BCM 26 or other VSM of the vehicle 12. Any combination of the level of control and/or time period for enablement can be used, all of which can be specified by a user using application 92 and/or which may be part of a predefined limited access mode, such as a valet mode.

The HWD 90 can also include a rechargeable battery. When the state of charge (SoC) of the rechargeable battery is low (i.e., below a predetermined SoC value), the HWD 90 can notify the user of the HWD 90 and query whether the user desires to activate the auxiliary key fob 14. In one embodiment, the HWD 90 may only present this query to the user when the HWD 90 determines that the user is using the HWD 90 as a vehicle key for the vehicle 12.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) receiver 22, engine control unit (ECU) 24, a body control module (BCM) 26, a wireless communications device 30, a passive entry passive start (PEPS) module 40, universal serial bus (USB) port 46, other VSMs 28, and numerous other components and devices. Some or all of the different vehicle electronics may be connected for communication with each other via one or more communication busses, such as communications bus 44. The communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS receiver 22, ECU 24, BCM 26, wireless communications device 30, PEPS module 40, USB port 46, and vehicle user interfaces 52-58, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. For example, other VSMs may include a center stack module (CSM), an infotainment unit, a powertrain control module, or a transmission control unit. Each of the VSMs 28 is preferably connected by communications bus 44 to the other VSMs, as well as to the wireless communications device 30, and can be programmed to run vehicle system and subsystem diagnostic tests. One or more VSMs 28 may periodically or occasionally have their software or firmware updated and, in some embodiments, such vehicle updates may be over the air (OTA) updates that are received from a computer 78 or remote facility 80 via land network 76 and wireless communications device 30. As is appreciated by those skilled in the art, the above-mentioned VSMs are only examples of some of the modules that may be used in vehicle 12, as numerous others are also possible.

The global navigation satellite system (GNSS) receiver 22 receives radio signals from a constellation of GNSS satellites 60. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. The GNSS received can determine a current vehicle location based on reception of a plurality of GNSS signals from the constellation of GNSS satellites 60. The vehicle location information can then be communicated to the wireless communications device 30, or other VSM, such as the BCM 26. In one embodiment, the wireless communications module 30 and/or a telematics unit can be integrated with the GNSS receiver 22 so that, for example, the GNSS receiver 22 and the wireless communications device 30 (or the telematics unit) are directly connected to one another as opposed to being connected via communications bus 44. In other embodiments, the GNSS receiver 22 is a separate, standalone module.

The engine control unit (ECU) 24 may control various aspects of engine operation, such as fuel ignition and ignition timing. ECU 24 is connected to communications bus 44 and may receive operation instructions from the BCM 26 or other vehicle system modules, such as telematics unit 30, the PEPS module 40, or other VSMs 28. In one scenario, the ECU 24 may receive a command from the BCM 26 to start the vehicle—i.e., initiate the vehicle ignition or other primary propulsion system (e.g., a battery powered propulsion system).

The body control module (BCM) 26 can be used to control various VSMs of the vehicle. And, in some embodiments, the BCM 26 obtains information concerning certain VSMs of the vehicle 12, including their present state or status, as well as sensor information. The BCM 26 is shown in the exemplary embodiment of FIG. 1 as being communicatively coupled to the communication bus 44. In some embodiments, the BCM 26 may be integrated with or part of a center stack module (CSM) and/or integrated with wireless communications device 30 (or with the PEPS module 40). Or, the BCM may be a separate device that is connected to other VSMs via bus 44. The BCM 26 can include a processor and/or memory, which can be similar to processor 36 and memory 38 of wireless communications device 30, as discussed below. The BCM 26 may communicate with wireless device 30 and/or one or more vehicle system modules, such as the ECU 24, audio system 56, or other VSMs 28; in some embodiments, the BCM 26 can communicate with these modules via the communications bus 44. Alternatively or additionally, the BCM 26 can communicate with SRWC devices, such as the HWD 90, via wireless communications device 30, which can use the SRWC circuit 32 and the communications bus 44. Software stored in the memory and executable by the processor of the BCM 26 enables the BCM 26 to direct one or more vehicle functions or operations including, for example, controlling central locking, air conditioning, power mirrors, controlling the vehicle primary mover (e.g., engine, primary propulsion system), and/or controlling various other vehicle modules.

A vehicle function is any function or operation that may be performed by the vehicle, including initiating or booting a wireless communications device, a GNSS receiver, an infotainment unit, a center stack module (CSM), or other VSM. Additionally, a vehicle function includes vehicle access functions, which are any vehicle functions that provide access to an interior cabin of the vehicle or that allow a user to start or otherwise control a primary propulsion system of the vehicle. For example, these vehicle access functions include unlocking/locking the vehicle doors and starting the ignition or primary propulsion system of the vehicle. Other vehicle functions can include heating or cooling passenger seats included in the vehicle, performing air conditioning or heating of the vehicle cabin, turning off/on or flashing headlights or other lights included in the vehicle, emitting an audible sound using a vehicle horn or speakers (such as those included in audio system 54), downloading information (e.g., information pertaining to a car sharing service reservation) or content data (e.g., audio/video playlists or files) from a remote facility 80 or computer 78, downloading or uploading information and/or content data from or to the HWD 90, and/or performing various other operations or functions of the vehicle, many of which are described herein.

The BCM 26 is communicatively coupled to the SRWC PEPS module 40 via the communications bus 44. The SRWC PEPS module 40 (also referred to as "PEPS module 40"), as explained in more detail below, receives BLE (or other SRWC) signals from the auxiliary key fob 14 (or other passive vehicle key) and then sends information contained in or conveyed by the BLE (or other SRWC) signals to the BCM 26. In one embodiment, the BLE (or other SRWC) signals include (e.g., convey) a virtual vehicle key, which can be a cryptographic token. This virtual vehicle key is then sent from the PEPS module 40 to the BCM 26. The BCM 26 then authenticates the virtual vehicle key. The authentication can include comparing the cryptographic key to information stored in the memory of the BCM 26. Other authentication and/or authorization processes known to those skilled in the art can be used as well. Also, the BCM 26 can determine an access mode or level for the virtual vehicle and, based on the type or level of access, the BCM 26 can permit one or more vehicle access functions (or other vehicle functions) to be performed in response to BLE (or other SRWC) signals received at the PEPS module 40 from the key fob (or other passive vehicle key). Once the virtual vehicle key is successfully authenticated (and/or authorized), the BCM 26 then permits the execution of one or more vehicle functions, such as unlocking the vehicle doors or starting the vehicle. The execution of the one or more vehicle functions can include sending a command over the communications bus 44 (or other communications path) to the appropriate VSM, such as the ECU 24.

The memory of the BCM 26 stores various authentication information, which can be information used to authenticate one or more external devices, such as one or more vehicle keys. The BCM 26 can also be configured to activate a particular vehicle key or deactivate a particular vehicle key. For example, the BCM 26 can include key authorization data that indicates whether a particular vehicle key is currently activated or deactivated. Also, in at least some embodiments, the key authorization data can indicate the permissions of the associated vehicle key, such as whether the key is allowed to direct the vehicle to carry out certain vehicle functions. In one embodiment, the key authorization data indicates whether the vehicle key is activated or deactivated, and an access mode of the vehicle key. The access modes of the vehicle key can include a regular (or full access) mode or a limited access mode. In the regular (or full access) mode, the vehicle key is entitled to direct execution of all the typical functionality associated with a vehicle key, such as all of the vehicle access functions. When the vehicle key is in the limited access mode, the key is entitled to direct execution of at least some vehicle functions, but the extent to which the vehicle functions are carried out is limited. For example, the limited access mode can allow the vehicle key to unlock the vehicle doors and start the vehicle, but may limit the vehicle speed when the vehicle is being driven using the vehicle key (or driven after having been started by the vehicle key). Alternatively or additionally, the limited access mode can include notifying a primary operator of the vehicle 12 when the vehicle is driven more than a predetermined distance away from the start location (i.e., the location when the vehicle was started). In one embodiment, the limited access mode can be a valet mode in which the vehicle functionality is limited or modified for purposes of permitting the vehicle to be valeted.

Wireless communications device 30 is capable of communicating data via short-range wireless communications (SRWC) through use of SRWC circuit 32 and/or via cellular network communications through use of a cellular chipset 34, as depicted in the illustrated embodiment. The wireless communications device 30 can provide an interface between various VSMs of the vehicle 12 and one or more devices external to the vehicle 12, such as one or more networks or systems at remote facility 80. This interface can be used to provide and/or facilitate communications between one or more other VSMs of the vehicle 12 and one or more external devices or networks. Also, the wireless communications device 30 can be incorporated with or can be a part of another VSM, such as a center stack module (CSM), the body control module (BCM) 26, an infotainment module, a head unit, a telematics unit, and/or a gateway module. In some embodiments, the wireless communications device 30 is a standalone module, and can be implemented as an OEM-installed (embedded) or aftermarket device that is installed in the vehicle.

In the illustrated embodiment, wireless communications device 30 includes the SRWC circuit 32, the cellular chipset 34, a processor 36, memory 38, and antennas 33 and 35. The wireless communications device 30 can be configured to communicate wirelessly according to one or more short-range wireless communications (SRWC) such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth™ Low Energy (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the wireless communications device 30 can be configured to communicate using IEEE 802.11p such that the vehicle can carry out vehicle-to-vehicle (V2V) communications, or vehicle-to-infrastructure (V2I) communications with infrastructure systems or devices, such as the remote facility 80. And, in other embodiments, other protocols can be used for V2V or V2I communications. The short-range wireless communication (SRWC) circuitry 32 enables the wireless communications device 30 to transmit and receive SRWC signals, such as BLE signals. The SRWC circuit 32 can allow the device 30 to connect to another SRWC device, such as the HWD 90. In one embodiment, the SRWC circuit 32 can enable the device 30 to connect to the auxiliary key fob 14. Additionally, in some embodiments, the wireless communications device 30 contains a cellular chipset 34 thereby allowing the device to communicate via one or more cellular protocols, such as those used by cellular carrier system 70. In such a case, the wireless communications device 30 is user equipment (UE) that can be used to in carry out cellular communications via cellular carrier system 70.

Wireless communications device 30 may enable the vehicle 12 to be in communication with one or more local or remote networks (e.g., one or more networks at remote facility 80 or computers 78) via packet-switched data communication. This packet-switched data communication may be carried out through use of a non-vehicle wireless access point or cellular system that is connected to a land network via a router or modem. When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

The processor 36 of the wireless communications device 30 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. The processor 36 executes various types of digitally-stored instructions, such as software or firmware programs stored in memory 38, which enable the device 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives. In one embodiment, the wireless communications device 30 also includes a modem for communicating information over the communications bus 44.

Figure 2:
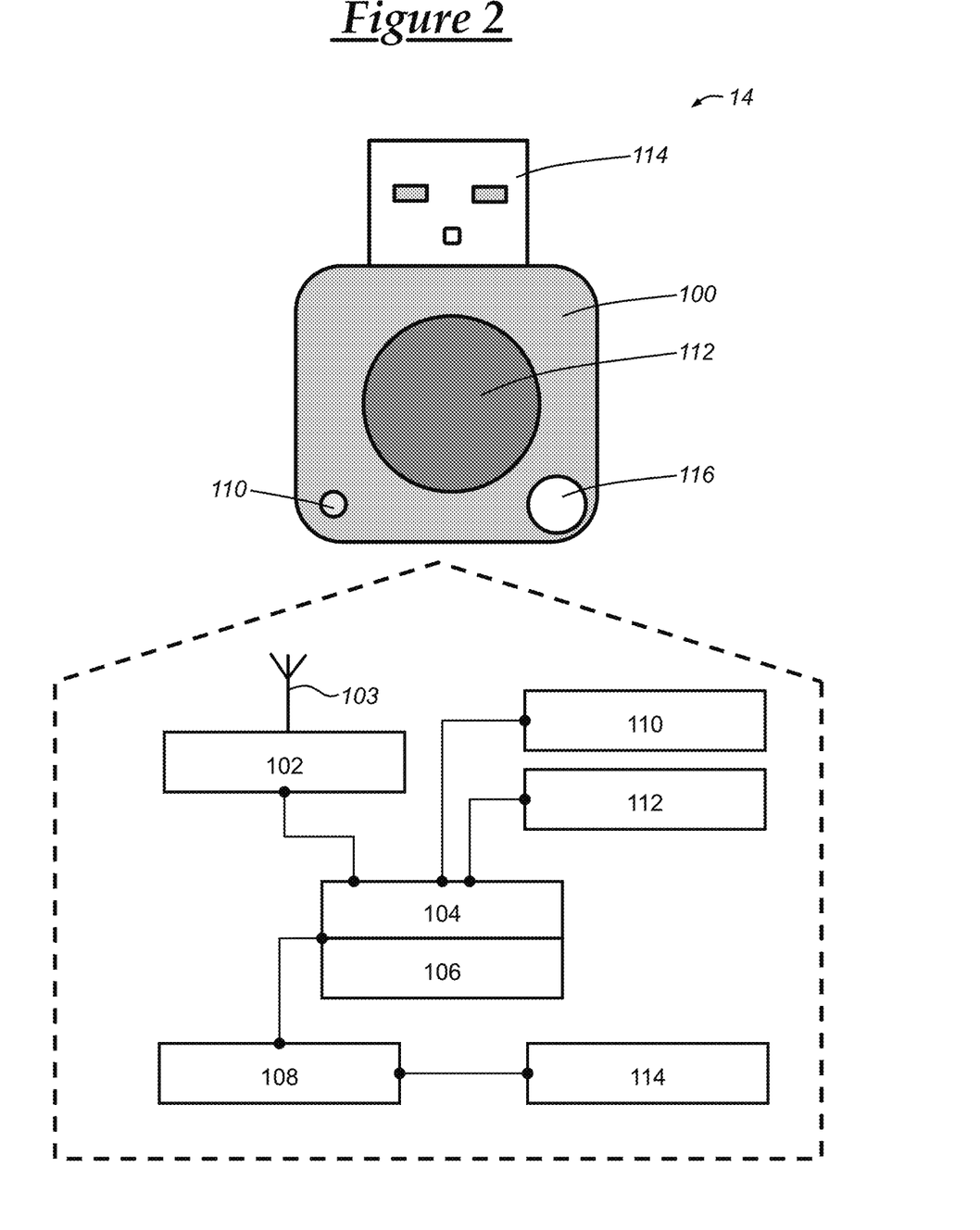
FIG. 2 is a block diagram depicting an embodiment of a short-range wireless communications (SRWC) auxiliary key fob that can be used to carry out at least part of the methods disclosed herein.

The passive entry passive start (PEPS) module 40 is another type of VSM that can be connected to the vehicle bus 44 and can provide passive detection of the absence or presence of a passive physical key or a virtual vehicle key (both of which are considered a passive vehicle key as used herein). A vehicle key can include a passive vehicle key or a conventional (or non-passive) vehicle key. A passive physical key can be a tangible key fob that has a primary purpose of serving as a key for the vehicle, such as the auxiliary key fob 14 (FIG. 2). For example, although a user's smartphone can be programmed or configured to serve as a vehicle code, the smartphone is not considered a passive physical key since the smartphone's primary purpose is not to be used as a key for a vehicle. A virtual vehicle key can be information or data that is used by a SRWC device, such as the HWD 90, that includes information imitating that of a passive physical key, or that is otherwise authenticated and authorized for use with the vehicle 12.

In many embodiments, the PEPS module 40 is a short-range wireless communications (SRWC) PEPS module and, specifically, a Bluetooth™ Low Energy (BLE) PEPS module. A SRWC PEPS module is a PEPS module that uses an IEEE 802.x standard (e.g., IEEE 802.15, IEEE 802.11) as a primary means for receiving information from and/or sending information to a passive key, and a BLE PEPS module is a PEPS module that uses a BLE standard (e.g., IEEE 802.15.1) as a primary means for receiving information from and/or sending information to a passive key. For example, the BLE PEPS module 40 includes a BLE circuit 42 and a dedicated antenna 41. The BLE PEPS module 40 is depicted as being a separate or standalone module, but in other embodiments, the BLE PEPS module 40 can be integrated with another VSM, such as the wireless communications device 30 and/or the BCM 26. In another embodiment, the SRWC PEPS module 40 can also include a key fob circuit that uses typical PEPS radio signals (i.e., those below 300 MHz, such as high frequency radio signals, medium frequency radio signals, and/or low frequency radio signals) in addition to the SRWC circuit 42.

When a passive vehicle key (e.g., HWD 90, key fob 14) comes within a predetermined distance of the vehicle 12, the BLE PEPS module 40 can establish a BLE connection with the auxiliary key fob 14 through use of the BLE circuit 42. In one embodiment, the BLE PEPS module 40 can detect the presence of the key fob and automatically establish a BLE connection with the key fob (e.g., the auxiliary key fob, the HWD) without having to receive input from the operator (e.g., entry of a PIN). Such an automatic connection can be securely established through use of preconfigured symmetric or corresponding keys that are stored at the PEPS module 40 and the key fob. This information, which can be referred to as BLE key data, can be stored at the PEPS module 40. The BLE key data can be a cryptographic key or other information that is used to automatically establish a secure BLE connection, and is separate than a virtual vehicle key that is used to provide access to the vehicle. In such an embodiment, the BLE key data can be used to encrypt BLE communications between the PEPS module 40 and the auxiliary key fob 14. However, in another embodiment, the BLE key data can also serve as a virtual vehicle key, or can be used as a part of a virtual vehicle key.

The vehicle 12 (e.g., the PEPS module 40 and/or the BCM 26) and/or the key fob 14 can be configured with this BLE key or other authentication information data (e.g., a virtual key) at a time of manufacture, or may be configured at a later time, such as during the establishment of a vehicle reservation. And, in one embodiment, the BCM 26 and/or PEPS module 40 can be provided with authentication information (e.g., BLE key data, a virtual vehicle key) that is included at the auxiliary key fob 14. This authentication information can be provided to the BCM 26 and/or PEPS module 40 as a part of an auxiliary key fob activation process, as described below. In other embodiments where another SRWC is used instead of (or in conjunction with) BLE, the authentication may be SRWC key data (instead of, or in addition to, the BLE key data).

The PEPS module 40 can determine whether the vehicle key belongs to the vehicle 12 and/or, in some embodiments, can determine whether the vehicle key is authorized and/or authentic (i.e., is authenticated). For example, the PEPS module 40 can compare a stored digital certificate (or other authentication information) to a digital certificate (or other authentication information) derived from a vehicle key. The digital certificate or other authentication information can be stored in memory of the BCM 26. In other embodiments, the authentication information can be stored at another VSM of the vehicle 12. When it is determined that the virtual vehicle key is authentic (e.g., the certificate or other authenticating information matches), the BCM 26 can carry out a vehicle function, such as a vehicle access function; for example, the BCM 26 can send a door unlock command to door locks of one or more vehicle doors. And, in at least some embodiments, the PEPS module 40 can transmit a BLE (or other SRWC) signal once a vehicle start pushbutton is pressed (and/or a brake pedal is engaged). This BLE (or other SRWC) signal can be received by a passive vehicle key (e.g., the BLE circuit 102 of the auxiliary key fob 14), which can then send a response back to the PEPS module 40, such as a BLE credentials message (discussed below). At this time, the PEPS module 40 can verify the response and, when successful, the PEPS module 40 can permit the vehicle to start (i.e., the engine or other primary propulsion system to start or become enabled) and/or start the vehicle. In other implementations, it is possible for the BCM 26 to carry out the functionality attributed to the PEPS module 40, or for the BCM 26 and/or the PEPS module 40 to be integrated into a single VSM.

The USB port 46 is female USB type A port (or connector) and is connected to a vehicle battery, such as a 12V (i.e., 12 Volt) battery included in the vehicle. The USB port 46 can be mated with the auxiliary key fob 14 via the USB connector 114 (FIG. 2) of the auxiliary key fob 14 and, when mated, the USB port 46 can provide an electrical connection between the auxiliary key fob 114 and the 12V vehicle battery so that the battery 108 (FIG. 2) of the auxiliary key fob 14 can be recharged. Other types of USB ports (or other hardwired ports) can be used as well, as described below with respect to the USB connection 114 (FIG. 2) of the auxiliary key fob 14. The 12V battery is used to provide many VSMs of the vehicle electronics 20 with electrical power. In other embodiments, the vehicle battery can be of a different voltage (e.g., 48V).

The vehicle 12 can include a docking port, slot, or portion that is reserved for storing or attaching the auxiliary key fob 14, and which may include the USB port 46 with which the auxiliary key fob 14 may be connected to for purposes of charging the battery. In some embodiments, the USB port 46 can also be used for data transmissions between the key fob and another device, such as vehicle 12. In one embodiment, the auxiliary key fob 14 and the vehicle 12 can be initially "paired" or can exchanged BLE key data over this USB connection so that an automatic connection can be established between the auxiliary key fob 14 and the vehicle 12 using the previously exchanged BLE key data. This initial pairing process can be initiated and controlled through use of one or more vehicle user interfaces (e.g., display 58), as discussed below. Additionally or alternatively, this initial pairing process can be initiated and controlled through the application 92 of the HWD 90.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the wireless communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions.

Various other vehicle user interfaces can also be utilized, as the interfaces of FIG. 1 are only an example of one particular implementation.

The auxiliary key fob 14 used in the vehicle communications system 10 is a SRWC device that may be implemented as any electronic device that can transmit SRWC signals. In one embodiment, the auxiliary key fob 14 transmits Bluetooth™ Low Energy (BLE) signals. The auxiliary key fob 14 may be a standalone (dedicated) device and/or incorporated into any other device suitable for handing off to a valet attendant or other person. The key fob memory may store and transmit a cryptographic key used for key fob validation at the vehicle. Some functions of the auxiliary key fob 14 with the vehicle 12 may be passive (e.g., not requiring manual input by the user) such as enabling unlocking of the vehicle doors when the key fob is in the proximity of the vehicle, while other functions may require active input, such as a button press on the auxiliary key fob 14 to, for example, unlatch a trunk of the vehicle. In any event, transmission of a wireless signal that conveys the cryptographic key may initiate or control one or more of the vehicle functions such as locking and unlocking doors, starting the vehicle, operating a vehicle alarm system, operating a vehicle trunk release, other vehicle access function, or other vehicle functions. In one embodiment, the key fob may be paired (or an association may be established) with a particular vehicle, but may not be activated until a user initiates and successfully completes a key fob activation process using the HWD 90 and/or the vehicle 12. The auxiliary key fob 14 can then remain activated for a certain amount of time, as specified by the user, or until the user deactivates the auxiliary key fob 14, which can be caused through ending a valet mode via, for example, the vehicle management application 92 of the HWD 90, as discussed more below.

With reference to FIG. 2, the auxiliary key fob 14 is shown, and includes a Bluetooth™ Low Energy (BLE) circuit 102 with antenna 103, processor 104, memory 106, battery 108, light emitting diode (LED) 110, button 112, universal serial bus (USB) connector 114, and keyring hole 116. The auxiliary key fob 14 can include a housing 100 to retain and protect the electrical hardware components. The BLE circuit 102 is a SRWC circuit that is configured to communicate using BLE signals; in other embodiments, the auxiliary key fob 14 can use a different SRWC for wireless communications, such as Wi-Fi™ or Wi-Fi™ Direct. The BLE circuit 102 includes a radio transmitter that can transmit BLE signals and a receiver that receives BLE signals. In one embodiment, these BLE signals can be between 2.402 and 2.480 GHz; in other embodiments, the auxiliary key fob 14 can communicate using other ultra-high frequency (UHF) signals (e.g., 300 MHz to 3 GHz). The BLE (or other SRWC) signals transmitted by the auxiliary key fob 14 can convey information through use of various modulation techniques and other information conveying techniques used with radio waves, as is known to those skilled in the art. In one embodiment, the key fob lacks a conventional radio transmitter and a traditional radio receiver that are typically used with conventional PEPS module, such as those that do not use an IEEE 802.x standard (e.g., Wi-Fi™, Bluetooth™) for communications, but instead uses other frequencies below the UHF band (i.e., below 300 MHz).

In one scenario, the vehicle 12 can send a BLE signal in response to a user pressing a start button (e.g., a push-to-start button) on a vehicle and, in response to receiving the BLE signal, the BLE circuit 102 responds by sending a BLE signal. This BLE signal can convey credentials, such as a cryptographic token, other data representing a virtual vehicle key, or other information that can be used for authentication. This BLE signal that conveys the credentials can be referred to as a BLE credentials message. In one embodiment, the BLE credentials message can be based on information contained in the BLE signal sent from the vehicle 12. For example, the BLE credentials message can be a response that is sent in response to receiving a challenge from the BLE PEPS module 40.

As discussed above, the vehicle 12 and the auxiliary key fob 14 can automatically establish a BLE connection. After establishing the BLE connection, the auxiliary key fob 14 can send the BLE credentials message to the PEPS module 40. When the PEPS module 40 receives a BLE signal (e.g., the BLE credentials message), the PEPS module 40 can send information contained in the BLE signal to the BCM 26 (or another VSM) so that the information can be used to determine whether the user is authorized to access the vehicle and/or carry out vehicle functions. This determination may include (i) authenticating the auxiliary key fob 14 by comparing the cryptographic token received from the key fob (e.g., as communicated in the BLE credentials message) with one stored in the BCM 26 and assuming a match, (ii) confirming that the key fob has been activated based on key authorization data stored on the vehicle. Once the key fob 14 is authenticated and confirmed as activated, the BCM 26 can unlock the vehicle doors, enable the vehicle for starting the primary propulsion system, and/or otherwise provide access to the vehicle.

The auxiliary key fob 14 can include a program or application that is stored in memory device 106 and that can be operated or executed by the processor 104. The operation and/or execution of the program can cause the processor to process received inputs from the button 112 (or other manual input sensors that may be included as a part of the auxiliary key fob 14) and to process messages received via the BLE circuit 102. Also, the program can cause the processor to send, via the BLE circuit 102, vehicle commands to the vehicle (e.g., PEPS module 40) based on the received inputs and/or messages, establish a BLE connection, and/or send the BLE credentials message. The auxiliary key fob 14 may only send vehicle commands when the auxiliary key fob 14 is activated. At least in some embodiments, the enabling and disabling of the key fob can be carried out in part by the HWD 90 (or other remote device) communicating with the remote facility 80. In at least some embodiments, the key fob is considered "activated" when the BCM (or other authenticating VSM) permits control of the vehicle by the key fob; when the key fob is not activated, the key fob is considered deactivated. As mentioned above, the BCM 26 can store key authorization data for each vehicle key that is associated with the vehicle 12. This data can indicate whether the vehicle key is activated or deactivated, and the type of access the vehicle is entitled to or authorized as carrying out. The key authorization data can be separate than the authentication information that is also stored on the memory of the BCM 26, or this information can be integrated with one another.

Electronic processor 104 can be connected to receive input from the sensor(s) and, at least in some embodiments, to send and receive messages via the BLE circuit 102. Also, the processor 104 can be any type of device capable of processing electronic instructions including microprocessors, microcontrollers, host processors, controllers, vehicle communication processors, and application specific integrated circuits (ASICs). The processor 104 executes various types of digitally-stored instructions, such as software or firmware programs stored in memory 106, which enable the auxiliary key fob 14 to carry out a wide variety of functionality or services. Memory 106 may include RAM, other temporary powered memory, any non-transitory computer-readable medium (e.g., EEPROM), or any other electronic computer medium that stores some or all of the software needed to carry out the various external device functions discussed herein. The memory 106 can be any of those types of memory types discussed above with respect to memory 38 of the wireless communications device 30 of the vehicle 12.

LED 110 can be a single LED or may be comprised of numerous LEDs. In one embodiment, the auxiliary key fob 14 only includes one (or a single) LED. LED 110 can be used to indicate a certain state or status of the auxiliary key fob 14, as will be discussed more in detail below. In one embodiment, the LED 110 blinks green every few seconds (or emit green light without blinking) to indicate that the key fob is in backup mode or that the key fob is activated with regular or full access. Additionally, the LED 110 can blink yellow every few seconds (or emit yellow light without blinking) to indicate that the key fob is in valet mode or some other limited access mode. Moreover, when the state of charge (SoC) of the battery 108 of the auxiliary key fob 14 is below a predetermined level (i.e., the battery power is considered low), the LED 110 can blink red (or emit red light without blinking). When the battery is low (i.e., the SoC being below the predetermined level), the LED 110 can alternate between emitting red light and green light (when in regular or full access mode) or between emitting red light and yellow light (when in valet or limited access mode). In such an embodiment, the LED 110 can be considered a single LED element, but may actually contain three separate LED emitters; that is, for example, a red emitter, a blue emitter, and a green emitter. Of course, other colors, LED configurations, and number of LEDs can be used.

Button 112 can be used to control certain aspects of the auxiliary key fob 14 and/or may be used to command the vehicle 12 to perform some operation or function, such as a door unlock/lock toggle function and/or for flashing vehicle headlights or other exterior lights so that, for example, an individual can locate the vehicle 12. In one embodiment, when the button 112 is pressed, a control signal from a button sensor is sent to the processor 104. In some embodiments, the auxiliary key fob 14 only includes a single button, which can be a physical button capable of being depressed.

Battery 108 is used to power the components 102-106 and 110-112. In one embodiment, the battery 108 is a lithium-ion battery that is rechargeable through receiving electrical current via the USB connector 114. Additionally or alternatively, the battery 108 can be replaced by a consumer or user of the auxiliary key fob 14. In other embodiments, the battery 108 is capable of inductive (or wireless) charging. When the battery 108 is being charged, the LED 110 can emit light indicating that the battery 108 is presently being charged, such as through blinking blue. And, when the battery 108 is fully charged (or above a predetermined threshold), the LED 110 can emit a steady blue light.

Universal serial bus (USB) connector 114 is a male USB type A connector. The USB connector 114 can be another type of USB connector, such as a type B, mini-B, micro-B (e.g., 5 pin, 10 pin), or type C connector. The USB connector can be a USB generation 2.0 (or "USB 2.0") or a USB generation 3.0 (or "USB 3.0"). For example, the USB connector 114 can be a male USB 3.0 type C connector. In other embodiments, the USB connector 114 can be a female connector, and/or may be another wired connector, such as an Apple™ Lightning connector, a Thunderbolt™ connector, a DisplayPort™ connector, or other hardwired or pinned data connector. The USB connector 114 is complementary to the USB port 46 of the vehicle 12.

In one embodiment, the auxiliary key fob 14 and the HWD 90 can establish a direct SRWC connection, such as a BLE connection. In such an embodiment, the auxiliary key fob 14 can communicate with the HWD 90 and, through these communications, can inform the HWD 90 of whether the battery SoC is below a predetermined threshold (i.e., the battery is low) or of the SoC value of the battery at any time (e.g., 90% charged, 15% charged). The HWD 90 can then provide a notification to the user via a graphical display (or other device user interface) of the HWD 90. Such communications can include sending BLE signals using the BLE circuit 102, or can be carried out through short-range wireless communications (SRWC). Additionally or alternatively, the auxiliary key fob 14 can communicate with the HWD 90 via the vehicle 12 and/or the remote facility 80. In one embodiment, the auxiliary key fob 14 can be kept in a glove box of the vehicle (or other compartment of the vehicle 12) and can communicate with the PEPS module 40 of the vehicle 12 using the BLE circuit 102 (or the USB connection). The information contained in these messages can include the SoC of the battery or merely an indication that the SoC of the battery 108 is low. The vehicle 12 can then communicate this information to the HWD 90 via the SRWC circuit 32, or may communicate this information to the HWD 90 through the remote facility 80. In some embodiments, the latter case may be useful when the HWD 90 is located remotely from the remote facility 80 and/or when the HWD 90 is not connected to the vehicle 12 via SRWC.

Figure 3:
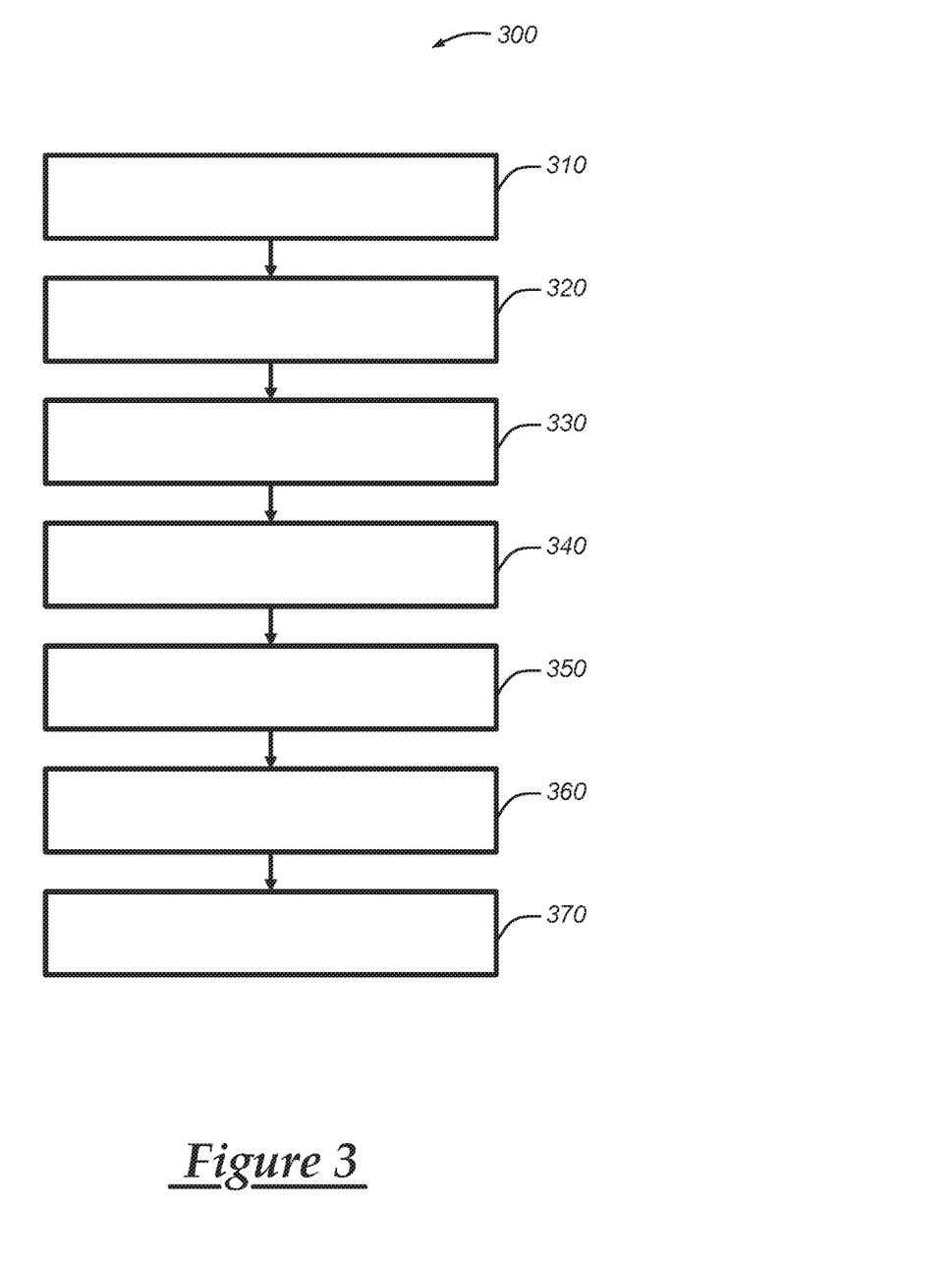
FIG. 3 is a flowchart illustrating a method of operating a vehicle using a key fob.

With reference to FIG. 3, there is shown an embodiment of a method 300 of operating a vehicle using a key fob. In many embodiments, the method 300 includes a process of activating a key fob for use with the vehicle. Although the method 300 is described as being carried out for an auxiliary key fob, the method 300 can be carried out for another passive vehicle key or other wireless vehicle key. In one embodiment, the method 300 is carried out in part or in whole by the vehicle 12.

The method 300 may be used in various scenarios. In one scenario, a primary operator of the vehicle 12 may desire to activate the auxiliary key fob 14 (which can be a backup or secondary key fob) so that another individual can use the auxiliary key fob 14 to access and/or operate the vehicle 12. To do this, the primary operator may make an initial activation request using an application installed on a mobile device, such as the vehicle management application 92 on the HWD 90, for example. The request is sent to the remote facility 80, which then verifies the authenticity (and/or authorization information) contained or associated with the request. Once verified, the remote facility 80 then sends a command to the vehicle 12 to direct the vehicle to activate the auxiliary key fob 14. Thus, in this scenario, the primary user can activate the key fob so that another individual can access and/or operate the vehicle, even when the primary user is remotely located from the other individual and/or the vehicle.

In another scenario, the primary operator of the vehicle 12 may desire to have the vehicle 12 valeted. The primary operator can generate a request to activate the auxiliary key fob 14 in a valet mode, with the request being generated using the HWD 90 or vehicle user interfaces of the vehicle 12. The request is then processed remotely by the remote facility 80 and the subsequent steps are carried out in a manner similar to that of the previous scenario described above, except that the key fob is activated in a valet mode instead of a regular or full access mode. Thus, in this scenario, the primary user can activate the key fob so that the valet attendant can access and/or operate their vehicle without the primary user having to hand over their HWD 90 (or other vehicle key).

The method 300 begins with step 310 wherein the key fob and the PEPS module are paired with one another. The pairing process can include two phases: a BLE pairing process and a virtual key pairing process. The BLE pairing process can include storing BLE key data at both the auxiliary key fob 14 and the PEPS module 40. The BLE key data can be symmetric or corresponding keys (e.g., long-term secret key) that are generated during this pairing step. The BLE key data can be generated by a remote facility, such as the remote facility 80, or can be generated by the vehicle (or the auxiliary key fob). In the latter case, the auxiliary key fob 14 can be connected to the vehicle electronics 20 via the USB connection (e.g., the connection between the USB connector 114 and the USB port 46), and the PEPS module 40 (or other VSM) and the auxiliary key fob 14 can exchange information (e.g., perform a handshake) that can be used to generate or otherwise establish the BLE key data (e.g., the shared secret between the PEPS module 40 and the auxiliary key fob 14). This BLE pairing process can be initiated automatically when the auxiliary key fob 14 is connected to the USB port 46 of the vehicle when it is determined that the auxiliary key fob and the PEPS module 40 are not already paired. This BLE pairing process that does not use a remote server can be referred to a local BLE pairing process.

In another embodiment, a vehicle dealer or manufacturer can initiate this BLE pairing process as described above, or through use of the remote facility 80. In the latter case, the vehicle dealer can send information concerning the auxiliary key fob 14 to the remote facility 80, which can then generate BLE key data that is then sent to the vehicle 12. The vehicle 12 can receive the BLE key data at the wireless communications device 30 and then send the BLE key data to the PEPS module 40, which can store this data on a memory device. This BLE pairing process that uses the remote facility 80 (or other remote server) can be referred to as a remote BLE pairing process. Other initial BLE pairing processes can be used as well.

In addition to the BLE key data, the pairing process can also include a key pairing process. The key pairing process can include generating a virtual vehicle key (e.g., a cryptographic token or other authentication information) for the auxiliary key fob to use to access the vehicle. The key pairing process can be initiated by a vehicle dealer or manufacturer by sending a key pairing message to the remote facility 80, which can then generate and/or send the generated virtual keys to the vehicle 12. The key pairing message can be sent using a computer (e.g., computer 78) and can include information pertaining to the auxiliary key fob, which can be authentication information concerning the auxiliary key fob 14 or an identifier of the auxiliary key fob 14. In the former case, the authentication information can be stored on the auxiliary key fob as a part of initially manufacturing or configuring the auxiliary key fob 14. In the case when the key pairing message includes an identifier of the auxiliary key fob 14, the remote facility 80 can access database 82 that includes authentication information for the auxiliary key fob 14. In either of these scenarios, the authentication information can be a virtual vehicle key that is stored in memory 106 of the auxiliary key fob 14. In other embodiments, the authentication information can be a virtual vehicle key that is generated as a part of this key pairing process, and that is then sent to the vehicle 12 and the auxiliary key fob 14. The vehicle 12 can receive the authentication information for the auxiliary key fob 14 via wireless communications device 30, which can then send this information to the BCM 26 (or the PEPS module 40).

As mentioned above, this virtual vehicle key may be preprogrammed into the key fob 14; for example, the key fob may include this virtual vehicle key pre-stored in memory prior to step 310, such as by pre-storing it prior to delivery of the vehicle to the original customer (purchaser or lessee). For the vehicle, the virtual vehicle key may be pre-stored in the vehicle also during manufacture or prior to delivery to the customer, or may be supplied later, such as in response to the initial activation request from the primary operator. The virtual vehicle key itself can be stored in memory of the BCM 26 (or other VSM of the vehicle 12), and/or other authentication information that can be used to authenticate the virtual vehicle key can be stored at the BCM 26 (or other VSM). As mentioned above, in some embodiments, this establishment step can be carried out by the remote facility. For example, the remote facility 80 can send the virtual vehicle key of the key fob (or other authentication information) to the vehicle 12 via a secure connection using wireless carrier system 70 and/or land network 76.

In some embodiments, this establishment step can be initiated at a dealership or a fleet manager. For example, a dealership can program the vehicle 12 to recognize and authenticate a particular key fob, such as auxiliary key fob 14. This can include any of those steps discussed above, such as storing the virtual vehicle key or other authentication information for the key fob at the vehicle 12. And, in some embodiments, the auxiliary key fob 14 can be programmed or configured with a virtual vehicle key (e.g., a digital key that is generated by the remote facility 80) and/or other authentication information.

In another embodiment, the primary operator of the vehicle 12 can use the application 92 of the HWD 90 to refresh the virtual vehicle key. In such an example, the HWD 90 sends a vehicle refresh message to the remote facility 80 that then authenticates and verifies the authorization of the user. Then, the remote facility 80 can send a virtual vehicle key for the auxiliary key fob 14 to the vehicle 12 and/or the HWD 90; in other embodiments, the vehicle refresh message can include a newly generated virtual vehicle key. This virtual vehicle key can be a new virtual vehicle key that is generated at the remote facility 80 in response to receiving the vehicle refresh message, in some embodiments. The vehicle 12 can then store the virtual vehicle key at the BCM 26 or another VSM. The HWD 90 can also send a refresh message (which can be the same refresh message) to the auxiliary key fob via a BLE connection established between the auxiliary key fob 14 and the HWD 90. This key fob refresh message can include a new virtual vehicle key, which can be stored in memory 106 of the auxiliary key fob 14. This scenario can be useful when the auxiliary key fob 14 is malfunctioning or otherwise failing to permit access to the vehicle (assuming the key fob is activated). The method 300 continues to step 320.

In step 320, the vehicle 12 receives an activation request from a remote facility to activate the key fob. In one embodiment, an initial activation request can first be generated by a user through use of the vehicle management application 92 (or other application) of the HWD 90. Or, the initial activation request can be first generated by the user through use of one or more vehicle user interfaces, over an Internet web-portal, or through a user calling a help telephone line and answering security questions. The user can specify an access mode, such as a regular (or full access) mode or a limited access mode (e.g., valet mode). The application that is used by the user to input the request (e.g., the application 92, an application executed by the vehicle) can include verification/authentication steps, such as querying the user to input a pin, input a password, carry out two-factor authentication, or carry out other forms of authentication. In one embodiment, the user can use the touchscreen display 58 to input a security pin and select the key access mode (e.g., regular or full access, valet mode or other limited access). In the case of the user using the application 92, the verification/authentication step can include the user entering credentials, such as a username and password into a graphical user interface (GUI) of the application 92. In the case of using the application 92, these steps can be carried out by a primary operator that is located remotely from the vehicle 12.

The user can then submit the request to the remote facility 80, which processes and verifies the initial activation request. The remote facility 80 can verify credential information or other authentication (and/or authorization) information that is passed along with the initial request or as a part of another message from the HWD 90 (or the vehicle 12). This authentication information can include a cryptographic token that is generated for the user's account or for the particular vehicle. In one particular embodiment, the cryptographic token can be generated in response to a reservation by the primary operator that is made as a part of a car sharing network in which the primary operator reserves and rents the vehicle 12. In such a case, once the reservation is terminated, the virtual vehicle keys (or cryptographic tokens) are revoked, which can include modifying key authorization data and/or authentication information at the vehicle.

Then, once the remote facility 80 processes and verifies this initial request, the remote facility 80 can generate the activation request that is sent to the vehicle using, for example, wireless carrier system 70 and/or land network 76. The activation request can be received at the wireless communications device 30. The activation request can specify the access mode in the initial request, as well as certain parameters defining the type and/or extent of access for the auxiliary key fob 14. In many embodiments, the activation request includes at least part of the authentication information in the initial request, such as the cryptographic token. An acknowledgement message can be sent back to the HWD 90 (or vehicle 12) that indicates whether the activation was successful. The method 300 continues to step 330.

In step 330, the key fob is activated. In many embodiments, the key fob is activated by the vehicle 12 through modifying or configuring certain electronic instructions or memory of the BCM 26. For example, once the activation request is received at the wireless communications device 30, certain contents of the message (or the whole message) can be sent to the BCM 26 via the communications bus 44. These contents can identify the key fob to which the request pertains and can also include key authorization date that specifies the type of access (and/or other access parameters) for the key fob. The BCM 26 can then modify key authorization data associated with the identified key fob that is stored in memory of the BCM 26 to reflect these details. As an example, prior to the activation of the auxiliary key fob 14, the auxiliary key fob 14 is associated with key authorization data that reflects that the auxiliary key fob 14 is deactivated (or disabled). Once the BCM 26 receives instructions or other information from the remote facility 80 (via the communications device 30), the BCM 26 can modify this key authorization data to reflect that the auxiliary key fob 14 is activated. This modification can also be carried out such that the key authorization data reflects a particular access mode and/or certain access parameters or other activation parameters.

In one embodiment, the activation request can specify a valet mode to be the access mode for the auxiliary key fob 14. The valet mode can be associated with certain limited access functionality, such as not allowing the vehicle 12 to exceed a speed over a predetermined value (e.g., 30 miles per hour). Or, the valet mode can permit certain (or all) functionality, but notify the primary operator of the vehicle 12 when certain predefined events occur. One example of a predefined event is the vehicle exceeding a speed limit, and another example is the vehicle travelling outside of a predefined geographical area (or is driven more than predetermined distance away from the user's HWD or valet drop off location), which can be referred to as a "geo-fence." In some scenarios, a single vehicle can be associated with numerous HWDs through the vehicle management application 92 (or other application). Thus, in one embodiment, these event notifications can be provided only to the HWD associated with the user that activated the auxiliary key fob 14 in the valet mode and not the other HWD(s) associated with the vehicle. Also, as those skilled in the art will appreciate, the vehicle itself can be placed into a valet mode in which the vehicle's functionality is limited, such as in the ways discussed above. Thus, in one embodiment, when generating the initial activation request (see step 320), the user may need to only specify that the key fob is to be activated in valet mode. Then, when the vehicle receives the activation request from the remote facility 80, the vehicle can then place itself into the valet mode. In this embodiment, it is not the key fob that is actually associated with a valet mode (or limited access mode) at the BCM 26, but the vehicle itself is limited. In other embodiments, the vehicle 12 can place itself in valet mode and the BCM 26 can modify key authorization data for the auxiliary key fob 14. In other embodiments, the vehicle can treat the primary key (or the key used by the primary operator prior to the valeting of the vehicle) as still having full access and can then treat all other keys as being in valet mode.

Once the key fob is activated at the vehicle 12, the auxiliary key fob 14, in some embodiments, can be notified. The notification can be sent from the vehicle 12 to the auxiliary key fob 14 via the PEPS module 40 using the PEPS antenna 41. In another embodiment, the HWD 90 can send the notification to the auxiliary key fob 14. In such embodiments, the auxiliary key fob 14 can include a SRWC circuit (such as one similar to the SRWC circuit 32 of the wireless communications device), or the auxiliary key fob 14 can use the BLE circuit 102 for these communications. The notification can specify the access mode and/or other information regarding the activation of the auxiliary key fob 14. When the auxiliary key fob 14 receives a notification that it has been placed in a regular or full access mode, the auxiliary key fob 14 can blink green periodically and, when the auxiliary key fob 14 receives a notification that it has been placed in a valet or other limited access mode, the auxiliary key fob 14 can blink yellow (or another color) periodically. Also, the PEPS module 40 can be used to detect when the auxiliary key fob 14 is left in the vehicle, and this information can be passed to the BCM 26 (or other VSM). When the auxiliary key fob 14 is left in the vehicle and is activated, an alert can be issued by the vehicle (using a horn and/or vehicle user interface(s)) so that the user of the auxiliary key fob 14 can become aware of this. In one embodiment, once the auxiliary key fob 14 is activated, the vehicle 12 can be unlocked when it is determined that the vehicle is locked. The method 300 continues to step 340.

In step 340, the vehicle receives an RF signal from the key fob at the PEPS module. For example, the auxiliary key fob 14 may come within a predetermined distance of the vehicle (or PEPS module) and, thus, the PEPS module 40 can detect the key fob's presence. This can be done through the BLE circuit 102 receiving a beacon (or broadcast) BLE signal that is sent by the PEPS module 40 of the vehicle 12, and then responding by sending a BLE connection request signal back to the PEPS module 40. A secure BLE connection is then automatically established. Then, through using the secure BLE connection, the auxiliary key fob 14 can send a BLE credentials message that conveys a virtual vehicle key or other information used to verify the authenticity of the auxiliary key fob 14. In one scenario, the BLE credentials message can also instruct the vehicle to unlock the vehicle doors. In another scenario, the BLE credentials message instructs the vehicle to start the ignition (or other primary mover). And, in another embodiment, the vehicle 12 can determine which vehicle function to carry out based on various vehicle sensor information, such as that which is obtained by the BCM 26. The method 300 continues to step 350.

In step 350, the PEPS module sends information to the BCM (or other VSM). For example, once the vehicle 12 receives the BLE credentials message at the PEPS module 40, authentication information contained in the BLE credentials message can be extracted (e.g., demodulated, decoded, and/or decrypted) and sent to the BCM 26 via the communications bus 44. This authentication information can constitute the virtual vehicle key and/or other authentication information received from the auxiliary key fob 14 derived from the BLE credentials message. Other information can be sent to the BCM 26 as well, such as other non-authenticating information contained in or derived from the BLE credentials message. For example, the BLE credentials message may specify a vehicle function to be carried out, or the PEPS module 40 can determine a function to be carried out. An indicator of the vehicle function to be carried out can be sent to the BCM 26 as well. In one embodiment, the entirety of the data conveyed by the BLE credentials message is sent from the PEPS module 40 to the BCM 26. The method 300 then continues to step 360.

In step 360, a determination is made as to whether the key fob is authorized (activated) based at least in part on the authentication information received from the SRWC PEPS module. In one embodiment, the BCM 26 receives the authentication information from the PEPS module 40, and then verifies the authentication information. The BCM 26 can verify this authentication information using various authentication techniques, which can include using a certificate corresponding to a virtual vehicle key contained in the authentication information. Or, the virtual vehicle key can be compared to a matching or copy of the virtual vehicle key stored in memory of the BCM 26. Once the BCM 26 successfully authenticates the authentication information (and, thus, the key fob), it then determines whether the key fob is activated based on the key authorization data and, if activated, which access mode was selected by the primary operator. The method 300 continues to step 370; otherwise, the method can continue back to step 340 where the vehicle waits for another BLE signal.

In step 370, in response to the determination that the key fob is activated, the vehicle carries out a vehicle function. In some embodiments, the vehicle function can be sent from the PEPS module 40 to the BCM 26, as described in step 350. The vehicle function can be specified information identifying the vehicle function. In other embodiments, the BCM 26 can determine which vehicle function to carry out based on sensor information received from one or more VSMs of the vehicle. And, in another embodiment, the BCM 26 can determine which vehicle function to carry out based on this sensor information in conjunction with information received from the PEPS module 40. Once the vehicle determines what vehicle function to carry out, the vehicle can then carry out the vehicle function. This can include generating and/or sending command signals to one or more VSMs of the vehicle, such as to a door lock actuator, to the ECU 24, and/or to the wireless communications device 30. The method 300 then ends.

The method 300 can also be modified in a variety of ways, some of which are described below. It should be appreciated that any of the other embodiments described below are contemplated as being incorporated into any one or more of the embodiments described above to the extent such combination is technically feasible.

In another embodiment, when the auxiliary key fob 14 is activated and left in the vehicle (e.g., an operator has departed the vehicle and left the key fob in the vehicle), then the vehicle 12 can send a notification. This notification can be carried out through one or more of the vehicle user interfaces described above, through use of the vehicle's horn, or through sending a notification to the HWD 90 via SRWC or via the remote facility 80 (or other suitable connection).

In another embodiment, when an individual (or a driver) steps out of the car while the car is still running, the vehicle 12 can notify the vehicle management application 92 of the HWD 90. This notification can then cause the vehicle management application 92 to display a notification asking the individual whether the valet mode should be activated for the vehicle 12 and/or the auxiliary key fob 14. Other means of presenting the notification (e.g., audible notification) can be used as well. For example, when a user exits the vehicle but desires to have the vehicle remain powered on and in park, the user can place the auxiliary key fob 14 in valet mode, which will cause the vehicle to not lock out the user who may leave their primary key fob in the vehicle 12.

In another embodiment, the method 300 can include a deactivation step. The deactivation step includes deactivating the auxiliary key fob 14 through the primary operator generating a deactivation request using the HWD 90. The deactivation request can be sent from the HWD 90 to the remote facility 80 in a similar manner as the initial request of step 320. The remote facility 80 can verify the request and then send a deactivation command to the vehicle 12 via the land network 76 and/or the wireless carrier system 70. The vehicle 12 can receive the request and then inform the BCM 26, which can then modify the key authorization data for the auxiliary key fob 14, such that the key authorization data reflects that the key fob 14 is deactivated. In one embodiment, a primary key fob can be deactivated in a like manner.

In another embodiment, the method 300 can include a disassociation (or un-pairing) step. The disassociation step can include sending a disassociation message from the remote facility 80 to the vehicle 12 that informs the vehicle 12 to remove the auxiliary key fob authentication information from the BCM 26. For example, a cryptographic token (or virtual vehicle key) can be included in the BCM 26 as a part of the establishment step (step 310). This disassociation step can remove or delete that cryptographic token (or virtual vehicle key) from the memory of the BCM 26 (or other VSM). And, in some embodiments, the disassociation step can include removing BLE key data from the PEPS module 40 (or the BCM 26) of the vehicle 12.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, where the key fob activation does not involve the use of key authorization data to specify and identify the activated/deactivated status of the key fob, activation may be accomplished by downloading to the vehicle the key fob's pre-stored cryptographic token from the remote facility so that a match can be made when the key fob is used, and this match of tokens both authenticates the key fob and authorizes it as an active key fob. Multiple different tokens may be used to indicate different access levels (modes, such as a valet mode). Deactivation may then be accomplished by erasing the tokens from the vehicle memory. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" covers all of the following: "A"; "B"; "C"; "A and B"; "A and C"; "B and C"; and "A, B, and C."

The invention claimed is:

1. A method of activating and using an auxiliary key fob with a vehicle, the auxiliary key fob including a short-range wireless communications (SRWC) circuit and a universal serial bus (USB) connector, and the method comprising the steps of:
   pairing the auxiliary key fob and the vehicle, wherein the pairing includes storing a virtual vehicle key at a vehicle system module (VSM) of the vehicle;
   receiving an activation request at the vehicle, the activation request indicating to the vehicle to activate the auxiliary key fob for use with the vehicle, wherein the activation request is received from a primary operator of the vehicle via a remote facility in response to the remote facility receiving an initial activation request from the primary operator via a handheld wireless device (HWD), the initial activation request being generated at the HWD based at least in part on information inputted into the HWD by the primary operator, wherein the HWD includes a virtual vehicle key that permits the HWD to act as a vehicle key for the vehicle, and wherein the HWD is configured to present a notification when a state of charge (SoC) of a battery of the HWD is below a predetermined SoC value, the notification querying the primary operator via the HWD of whether the auxiliary key fob is to be activated;
   in response to the activation request, activating the auxiliary key fob in a particular access mode for use with the vehicle;
   receiving a SRWC credentials signal from the auxiliary key fob at a SRWC passive entry passive start (PEPS) module installed in the vehicle, the SRWC PEPS module including a SRWC circuit, and the SRWC credentials signal being communicated from the auxiliary key fob to the SRWC PEPS module via a secured SRWC connection and the SRWC circuit of the SRWC PEPS module;
   after receiving the SRWC credentials signal, sending information included in or derived from the SRWC credentials signal to the VSM of the vehicle;
   determining that the auxiliary key fob is authorized at the VSM based at least in part on the information sent to the VSM from the SRWC PEPS module; and
   carrying out a vehicle access function in response to the determination that the auxiliary key fob is authorized.

2. The method of claim 1, wherein the VSM is a body control module (BCM) of the vehicle, the BCM being separate from the SRWC PEPS module, and wherein the BCM and the SRWC PEPS module are communicatively coupled to one another via a communications bus.

3. The method of claim 1, wherein the SRWC circuit of the auxiliary key fob and the SRWC circuit of the PEPS module are each a Bluetooth™ Low Energy (BLE) circuit such that the SRWC PEPS module is a BLE PEPS module, and wherein the pairing step includes storing BLE key data at the BLE PEPS module.

4. The method of claim 3, further comprising the step of, after the activating step, establishing a secure BLE connection between the BLE PEPS module and the auxiliary key fob through use of the BLE key data, and wherein the SRWC credentials signal is a BLE credentials signal that is encrypted and sent over the established secure BLE connection from the auxiliary key fob to the BLE PEPS module.

5. The method of claim 1, wherein the pairing step includes pre-storing authentication information in the auxiliary key fob and in the VSM of the vehicle, wherein the activating step includes modifying key authorization data stored at the VSM, and wherein the determining step comprises:
   receiving the authentication information at the vehicle from the auxiliary key fob;
   authenticating the auxiliary key fob using the received authentication information and the authentication information that is pre-stored on the vehicle; and
   determining from the key authorization data that the auxiliary key fob is activated, wherein the key authorization data indicates whether the auxiliary key fob is activated or deactivated.

6. The method of claim 1, wherein the HWD is configured to send the initial activation request to the remote facility in response to determining that the auxiliary key fob is to be activated based on a response to the notification.

7. The method of claim 1, wherein the SRWC circuit of the auxiliary key fob only transmits wireless signals according to one or more IEEE 802.x standards.

8. The method of claim 1, wherein the activation request is generated at the vehicle based at least in part on information inputted into one or more vehicle user interfaces of the vehicle by a user of the vehicle.

9. The method of claim 8, wherein the user information inputted into the one or more vehicle user interfaces of the vehicle includes a user selected valet mode to be carried out at the vehicle.

10. The method of claim 9, wherein the particular access mode is the valet mode, the valet mode permitting the auxiliary key fob to be used in a limited access mode while allowing a primary vehicle key of the user to be used in a full access mode.

11. The method of claim 9, wherein the activation request is sent to a remote facility for verification of user credentials included as part of the information inputted into the one or more vehicle user interfaces of the vehicle, and wherein the activating step is carried out in response to the vehicle receiving a verification message from the remote facility.

12. A method of activating and using an auxiliary key fob with a vehicle, the auxiliary key fob including a short-range wireless communications (SRWC) circuit and a universal serial bus (USB) connector, and the method comprising the steps of:
   pairing the auxiliary key fob and the vehicle, wherein the pairing includes storing a virtual vehicle key at a vehicle system module (VSM) of the vehicle;
   receiving an activation request at the vehicle, the activation request indicating to the vehicle to activate the auxiliary key fob for use with the vehicle;
   in response to the activation request, activating the auxiliary key fob in a particular access mode for use with the vehicle, wherein the particular access mode is a backup key mode that permits the auxiliary key fob to act as a primary vehicle key;
   receiving a SRWC credentials signal from the auxiliary key fob at a SRWC passive entry passive start (PEPS) module installed in the vehicle, the SRWC PEPS module including a SRWC circuit, and the SRWC credentials signal being communicated from the auxiliary key fob to the SRWC PEPS module via a secured SRWC connection and the SRWC circuit of the SRWC PEPS module;
   after receiving the SRWC credentials signal, sending information included in or derived from the SRWC credentials signal to the VSM of the vehicle;
   determining that the auxiliary key fob is authorized at the VSM based at least in part on the information sent to the VSM from the SRWC PEPS module; and
   carrying out a vehicle access function in response to the determination that the auxiliary key fob is authorized.

13. A Bluetooth™ Low Energy (BLE) auxiliary key fob, comprising:
   a BLE circuit that transmits BLE signals using an antenna;
   a processor and memory, the memory storing BLE key data and a virtual vehicle key;
   a light emitting diode (LED) coupled to the processor;
   a rechargeable battery that powers the BLE circuit, the processor, and the LED;
   a universal serial bus (USB) connector being coupled to the rechargeable battery such that, when the USB connector is connected to a complementary USB port, electrical power is provided across the USB connector and to the rechargeable battery; and
   a housing enclosing at least the BLE circuit, the processor, the memory, and the rechargeable battery;
   wherein the BLE auxiliary key fob includes computer instructions that, when executed by the processor, causes the BLE auxiliary key fob to:
      establish a BLE connection with a BLE passive entry passive start (PEPS) module of the vehicle using the BLE key data in response to receiving a BLE beacon signal from the BLE PEPS module;
      after establishing the BLE connection with the BLE PEPS module of the vehicle, sending a BLE credentials message to the BLE PEPS module over the established BLE connection using the BLE circuit, the BLE credentials message including the virtual vehicle key; and
      determine whether the BLE auxiliary key fob is activated based on an indication received from an external device and to establish the BLE connection with the BLE PEPS module when it is determined that the BLE auxiliary key fob is activated.

14. The BLE auxiliary key fob of claim 13, further comprising a button that is communicatively coupled to the processor, the button causing a signal to be sent to the processor when the button is pressed, and wherein the processor causes the BLE circuit to transmit a BLE signal in response to the signal being received from the button.

15. The BLE auxiliary key fob of claim 13, wherein the BLE auxiliary key fob lacks wireless communication capabilities other than those that use a Bluetooth™ or other IEEE 802.x standard.

16. The BLE auxiliary key fob of claim 13, wherein the BLE auxiliary key fob is configured to emit light from the LED in response to determining that the BLE auxiliary key fob is activated for use with the vehicle.

* * * * *